(12) United States Patent
Didey et al.

(10) Patent No.: US 11,407,501 B2
(45) Date of Patent: Aug. 9, 2022

(54) ROLLER GEAR FOR A DRIVE SYSTEM

(71) Applicant: AIRBUS OPERATIONS LIMITED, Bristol (GB)

(72) Inventors: Arnaud Didey, Bristol (GB); Richard Billyeald, Bristol (GB); James Setter, Bristol (GB); Ian Dickason, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 313 days.

(21) Appl. No.: 16/702,361

(22) Filed: Dec. 3, 2019

(65) Prior Publication Data
US 2020/0239129 A1 Jul. 30, 2020

Related U.S. Application Data

(63) Continuation of application No. 15/126,957, filed as application No. PCT/GB2015/050752 on Mar. 16, 2015, now Pat. No. 10,513,328.

(30) Foreign Application Priority Data
Mar. 17, 2014 (GB) .................................. 1404727

(51) Int. Cl.
*B64C 25/00* (2006.01)
*B64C 25/40* (2006.01)
(Continued)

(52) U.S. Cl.
CPC .............. *B64C 25/405* (2013.01); *F16B 5/10* (2013.01); *F16B 21/04* (2013.01); *F16H 55/10* (2013.01); *F16B 21/02* (2013.01); *F16H 57/0427* (2013.01); *F16H 57/0464* (2013.01); *F16H 57/0471* (2013.01); *Y02T 50/80* (2013.01)

(58) Field of Classification Search
CPC .......... B64C 25/405; F16B 5/10; F16B 21/04; F16B 21/02; F16H 55/10; F16H 57/0427; F16H 57/0464; F16H 57/0471
See application file for complete search history.

(56) References Cited

U.S. PATENT DOCUMENTS

| 594,110 A | 11/1897 | Higgins |
| 860,536 A | 7/1907 | Ellingham |

(Continued)

FOREIGN PATENT DOCUMENTS

| BE | 517599 | 2/1953 |
| CN | 102549305 | 4/2012 |

(Continued)

OTHER PUBLICATIONS

International Search Report and Written Opinion of the ISA dated Jun. 22, 2015 International Application No. PCT/GB2015/050752.
(Continued)

*Primary Examiner* — Zakaria Elahmadi
(74) *Attorney, Agent, or Firm* — Nixon & Vanderhye P.C.

(57) ABSTRACT

A roller gear for use in a roller gear and sprocket configuration of a drive system is disclosed, particularly for use in a landing gear drive system of an aircraft. Alternative embodiments and, in particular, means for permitting removal and replacement of rollers and roller mounting pins in the roller gear are disclosed.

25 Claims, 9 Drawing Sheets

(51) Int. Cl.
  *F16B 5/10* (2006.01)
  *F16H 55/10* (2006.01)
  *F16B 21/04* (2006.01)
  *F16B 21/02* (2006.01)
  *F16H 57/04* (2010.01)

(56) References Cited

U.S. PATENT DOCUMENTS

| | | | |
|---|---|---|---|
| 1,200,203 A * | 10/1916 | Kroyer | F16H 55/10 74/465 |
| 1,289,508 A | 12/1918 | Melcher | |
| 2,293,907 A * | 8/1942 | Le Bus | F16H 1/24 74/415 |
| 3,490,306 A * | 1/1970 | Karl-Heinz | F16H 1/24 74/410 |
| 6,023,989 A * | 2/2000 | Imase | F16H 55/10 74/422 |
| 8,893,568 B2 * | 11/2014 | Katayama | F16H 57/0406 74/89 |
| 9,341,247 B2 * | 5/2016 | Lim | F16H 55/10 |
| 2006/0065779 A1 | 3/2006 | McCoskey et al. | |
| 2012/0090415 A1 * | 4/2012 | Lim | F16H 55/10 74/89.17 |
| 2012/0208668 A1 * | 8/2012 | Radisek | F16H 57/08 475/344 |
| 2013/0008267 A1 * | 1/2013 | Katayama | F16H 19/04 74/89 |
| 2013/0031996 A1 * | 2/2013 | Imase | F16H 55/10 74/465 |
| 2013/0186213 A1 * | 7/2013 | Lim | F16H 19/04 74/31 |
| 2014/0083221 A1 * | 3/2014 | Hein | B66C 23/84 74/421 A |
| 2014/0158820 A1 | 6/2014 | Wilson et al. | |
| 2014/0225421 A1 * | 8/2014 | Oswald | B64C 25/405 301/6.2 |
| 2014/0245853 A1 * | 9/2014 | Didey | B64C 25/34 74/421 A |
| 2016/0195167 A1 * | 7/2016 | Hofmann | F16H 1/26 74/405 |
| 2016/0229529 A1 * | 8/2016 | Christensen | B64C 25/405 |

FOREIGN PATENT DOCUMENTS

| | | |
|---|---|---|
| GB | 191118536 | 8/1912 |
| GB | 548910 | 10/1942 |
| JP | 2000065189 | 3/2000 |
| JP | 2002031214 | 1/2002 |
| JP | 2013019435 | 1/2013 |
| KR | 20070013424 | 1/2007 |
| WO | 2011023505 | 3/2011 |
| WO | 2014/023941 | 2/2014 |
| WO | 2014023939 | 2/2014 |

OTHER PUBLICATIONS

Chinese Notification of the First Office Action for related Chinese Application No. 201580013835.3, 20 pages, dated Jun. 4, 2018 (including translation).

Russian Office Action and English Translation for corresponding Russian Application No. 2016140483/11(064520), 11 pages, dated Sep. 12, 2018.

English Translation of Notification of Reasons for Refusal, for corresponding Japanese Application No. 2016-558134, three pages, dated Jan. 15, 2019.

* cited by examiner

ROLLER GEAR FOR A DRIVE SYSTEM

CROSS RELATED APPLICATIONS

This application is a Continuation of U.S. patent application Ser. No. 15/126,957, filed Sep. 16, 2016, now allowed, which is the U.S. National Phase of International Application No. PCT/GB2015/050752, filed Mar. 16, 2015, and claims priority from Great Britain Patent Application No. 1404727.8, filed Mar. 17, 2014, the entire contents of each of which are hereby incorporated by reference.

FIELD OF THE INVENTION

The present invention relates to a gear for a drive system for rotating one or more wheels of an aircraft landing gear for the purposes of ground taxiing (forwards or reverse) and/or wheel spin-up prior to landing and/or for applying braking torque to the rotating wheel(s).

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

Several autonomous ground taxi systems for both driving the wheels while the aircraft is on the ground and spinning them up prior to landing have been proposed in recent years.

An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

Such prior art systems are typically limited to nose landing gears because they take up too much space to be able to be integrated into a main landing gear in which much of the space around the wheels is taken up by braking systems. However, nose landing gears only support a small fraction of the vertical loads supported by the landing gear as a whole during ground taxi operations (approximately 5% of the aircraft weight). There may therefore be insufficient traction between a driven nose landing gear wheel and the ground to enable reliable aircraft ground taxiing. This is a particular concern when the aircraft centre of gravity is towards its aft limit and when the ground surface is slippery.

A prior art arrangement which is not restricted to nose landing gears is described in WO2011/023505. The disclosed system uses an actuator to move a pinion gear in and out of driving engagement with a ring gear mounted to the wheel hub. Roller gears have been identified as beneficial in such landing gear drive systems and have been disclosed in this context in WO2014/023939.

SUMMARY OF THE INVENTION

Components used in roller gears in aircraft landing gear have a finite useful life and so roller gears used in this context need dismantling for cleaning and component replacement, particularly for replacing or cleaning and lubricating the rollers and pins on which the rollers are mounted. These parts can represent critical components in the landing and take-off operations and so regular maintenance, as well as the labour cost and aircraft down-time associated with that maintenance are important and their impact should be minimised. To address these problems, the present invention proposes an improved roller gear for use in aircraft landing gear drive systems.

A first aspect of the invention provides a roller gear comprising:
  a series of rollers arranged to form a substantially circular array;
  at least two roller mounting members axially spaced from one another along an axis of rotation of the roller gear, each roller mounting member comprising a substantially circular array of openings for receiving roller mounting pins therein to mount the rollers between the roller mounting members;
  an array of roller mounting pins disposed in the openings, each of the roller mounting pins comprising a roller mounting shaft, having a longitudinal axis, for entering the roller mounting members and the roller to retain the roller relative to the roller mounting members;
  at least one of the roller mounting pins comprising a roller mounting pin head, delimited from the shaft by a change in radial dimension of the pin;
  the roller gear further comprising primary roller mounting pin retaining means, arranged to engage the head of the at least one roller mounting pin to prevent axial movement of the roller mounting pin in a direction of its longitudinal axis.

The roller gear of the invention is configured for convenient and repeatable removal and replacement of the rollers and roller mounting pins, which may also be termed roller pins. The arrangements described herein allow a low profile pin retaining means to be provided, which retains roller mounting pins in the roller gear in a repeatably removable manner, while adding little width to the roller gear beyond the width of the roller mounting members which support the roller mounting pins.

The primary roller mounting pin retaining means may be arranged to engage or disengage the roller mounting pin by relative rotational or translational movement between the roller mounting pin and the roller mounting pin retaining means.

The primary roller mounting pin retaining means may be arranged to engage or disengage the roller mounting pin by relative rotational movement between the roller mounting pin and the roller mounting pin retaining means.

The roller gear may further comprise secondary roller mounting pin retaining means for locking the primary roller mounting pin retaining means and the roller mounting pin in an engaged state.

The secondary roller mounting pin retaining means may be arranged to prevent relative rotational movement between the roller mounting pin and the roller mounting pin retaining means.

At least one of the primary or secondary roller pin retaining means may be a substantially annular member arranged to retain or lock the array of roller mounting pins simultaneously and/or to release or unlock the array of roller mounting pins simultaneously.

The roller gear may further comprise fixing means to fix at least one of the primary and secondary roller pin retaining means relative to a roller mounting member to which it is mounted.

The roller mounting pin head may have a maximum radial dimension greater than the radius of the pin mounting shaft, to prevent movement of the head relative to the roller mounting members in a first axial direction.

The roller mounting members may be attached to a core of the roller gear, the core preferably comprising a bore for receiving a shaft to which the roller gear is to be mounted.

The head of the roller mounting pin may have a first portion having a first radial dimension and a second portion having a second radial dimension, smaller than the first radial dimension.

The roller mounting pin head may have a first side having a first radial dimension and a second side having a second radial dimension, smaller than the first radial dimension. The head of the roller mounting pin may have a perimeter having a first, substantially arc-shaped, portion, and a second, substantially straight, portion.

At least one end, preferably each end, of the roller mounting pin may comprise an engagement feature, for engaging a tool to rotate the pin.

The primary roller mounting pin retaining means may be spaced from, and attached to, the roller mounting member.

The primary roller mounting pin retaining means may comprise a first portion extending axially relative to the rotational axis of the roller gear and a second portion extending radially relative to the rotational axis of the roller gear.

The primary roller mounting pin retaining means may comprise an annular portion arranged around a circumference of the roller mounting member.

The primary roller mounting pin retaining means may comprise a first, axially extending, annular portion, and a second, radially extending, annular portion.

The roller gear may further comprise secondary roller mounting pin retaining means, for restricting rotation of at least one of the roller pins.

The secondary roller mounting pin retaining means may be arranged to be detachably mounted adjacent the at least one roller pin head.

The secondary roller mounting pin retaining means may be arranged at a distance, from a centre of the opening in which the at least one roller pin is located, which is less than the maximum radial dimension of the roller pin head.

The secondary roller mounting pin retaining means may be arranged to restrict rotation of the pin via the roller pin head, preferably by engaging the roller mounting pin head.

The secondary roller mounting pin retaining means may be arranged to retain more than one roller mounting pin of the roller gear.

The secondary roller mounting pin retaining means may be a substantially annular ring, arranged such that at least one of its inner or outer edges is located at a distance, from a centre of the openings in which the roller pins are located, which is less than a maximum radial dimension of the roller pin heads.

The secondary roller mounting pin retaining means may be repeatably attachable and detachable from the roller mounting member to lock and release the roller mounting pins.

The roller gear according to any of the preceding claims, may comprise first, second and third roller mounting members, axially spaced from one another along an axis of rotation of the roller gear, so that first and second series' of rollers may be mounted in respective rings on the roller gear.

At least one roller mounting pin of the roller gear may have a neck of reduced diameter relative to the pin head and the pin shaft, for engaging the primary pin head retaining means to retain the pin in the roller gear.

The primary roller mounting pin retaining means may have a pin head retaining portion having a pair of opposed sides spaced apart by a distance greater than the diameter of the neck of the roller mounting pin and less than the diameter of the head and the diameter of the shaft of the roller mounting pin.

The primary roller mounting pin retaining means may further comprise a pin head release portion having opposing faces spaced apart by a distance greater than the diameter of the pin head or the shaft of the roller mounting pin. The primary pin head retaining means may have an opening formed therethrough, comprising the pin head retaining portion and the pin head release portion.

The primary roller mounting pin retaining means may be slidable relative to the roller mounting member to selectively locate the roller mounting pin head in the pin head retaining portion and/or in the pin head release portion.

The primary roller mounting pin retaining means may be a substantially annular ring comprising an array of openings comprising the pin head retaining portion and the pin head release portion.

The primary roller mounting pin retaining means may be arranged to be rotatable from a first position, in which the array of openings in the roller mounting members is aligned with the array of pin head retaining portions, and a second position, in which the array of openings in the roller mounting members is aligned with the array of pin head release portions.

In a further aspect, the invention provides a body for a roller gear comprising:
  first and second roller mounting members, each roller mounting member comprising a plurality of openings arranged in a substantially circular array, for receiving roller mounting pins to mount rollers thereto;
  at least one of the roller mounting members comprising roller mounting pin retaining means, arranged to engage a head of at least one of the roller mounting pins to retain the head between the roller mounting member and the roller pin head retaining means.

In a further aspect, the invention provides a roller mounting pin for a roller gear described herein, comprising:
  a pin mounting shaft, having a first diameter, for entering the roller mounting members and the roller, to rotatably mount the roller relative to the roller mounting members; and a head preferably having a first portion having a first radial dimension greater than the diameter of the pin mounting shaft, to prevent movement of the head relative to the roller mounting members in a first axial direction; and wherein the head of the pin preferably has a second portion having a second radial dimension, smaller than the first radial dimension.

The head may have a first side having a first radial dimension and a second side having a second radial dimension, smaller than the first radial dimension. The head may have a perimeter having a first, substantially arc-shaped, portion, and a second, substantially straight, portion. The pin may further comprise an internal engagement feature for engaging a tool to rotate the pin about its longitudinal axis. Each end of the roller mounting pin comprises an internal engagement feature, for receiving a tool to rotate the pin.

A further aspect of the invention provides an aircraft undercarriage drive system comprising a roller gear as described herein.

Preferably, the drive system is detachably mounted on the landing gear main leg. The drive system can therefore be removed for maintenance and/or when the aircraft is to be used for long range operations where it may not be economic to use the drive transmission due to its weight penalty in cruise.

The drive system may be mounted externally on the landing gear on either the sprung part (e.g. the strut) or on the un-sprung part (e.g. the slider or axle or bogie). The drive system may be pivotally mounted on the landing gear. The output shaft carrying the drive pinion may rotate about a substantially horizontal pivot axis displaced from the axis of rotation of the drive pinion. The first and second gears may move into and out of engagement by rotation about the pivot axis. The motor may move with the drive pinion about the pivot axis, or alternatively the motor may be static with respect to the pivot axis, or further alternatively the motor may rotate about the pivot axis as the drive pinion moves through an arc centred on the pivot axis.

The roller gear may for a drive pinion and/or the driven gear and may may include a constant-velocity joint or similar device between the gear and the shaft on which it is rotatably mounted. This can help to ensure that the driving engagement can be maintained as the landing gear deflects.

The landing gear may have only one driveable wheel. Alternatively, two or more of the landing gear wheels may be driven by one or more motors. A differential may be used between the motor(s) and the drive pinions. The motor may be electric or hydraulic, for example.

The gear attached to the wheel preferably has a larger diameter than the drive pinion to develop a significant torque magnifying gear ratio. By making use of the large hub diameter in this way, a mass optimised solution can be achieved.

When incorporated on an aircraft, the landing gear may be used with a power and control system for supplying power to, and controlling operation of, the drive transmission.

BRIEF DESCRIPTION OF THE DRAWINGS

Embodiments of the invention will now be described with reference to the accompanying drawings, in which.

DETAILED DESCRIPTION OF EMBODIMENT(S)

The illustrated embodiments are shown applied to an aircraft landing gear which has two wheels, but the principles of the embodiments may be applied to landing gear with any number of wheels including only a single wheel. The roller gear of the present invention may be applied in any drive system to engage a corresponding sprocket or pinion. The illustrated embodiment can be applied to a main landing gear (i.e. a landing gear attached to wing structure or fuselage structure in the region of the wings), since the weight supported by the main landing gear is considered to provide the best traction between the wheels and the ground to enable reliable aircraft ground taxiing. However, a drive system incorporating the roller gear of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

A drive system incorporating the roller gear of the present invention can also be applied to other drive chains, such as heavy machinery, vehicles, mining equipment, and any other machinery using rotational drive systems to realise the benefits of the invention, as will become apparent in the detailed description of the embodiments described herein.

Figure 1:
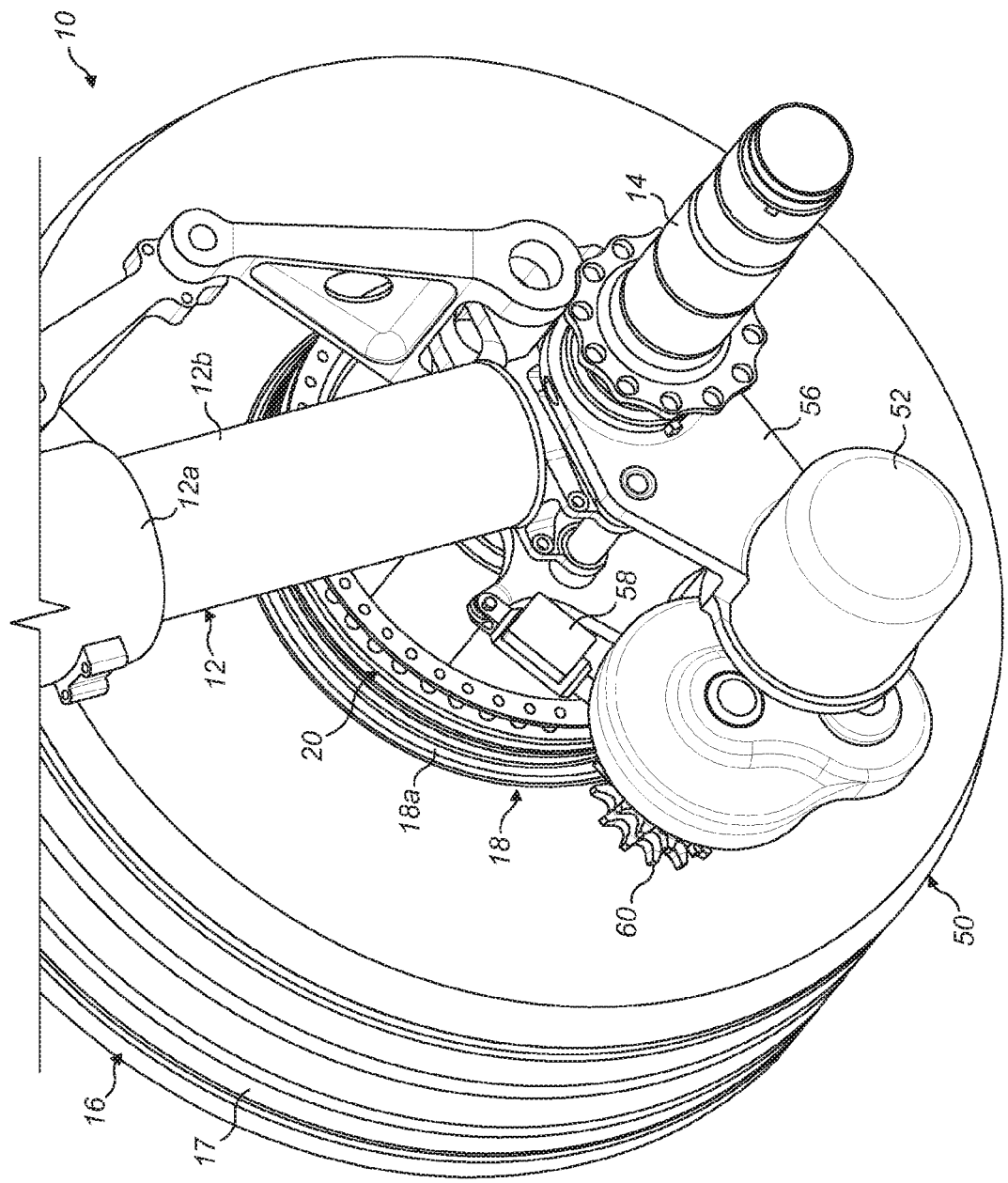
FIG. 1 shows an isometric view of a drive system according to a first embodiment.
Figure 2:
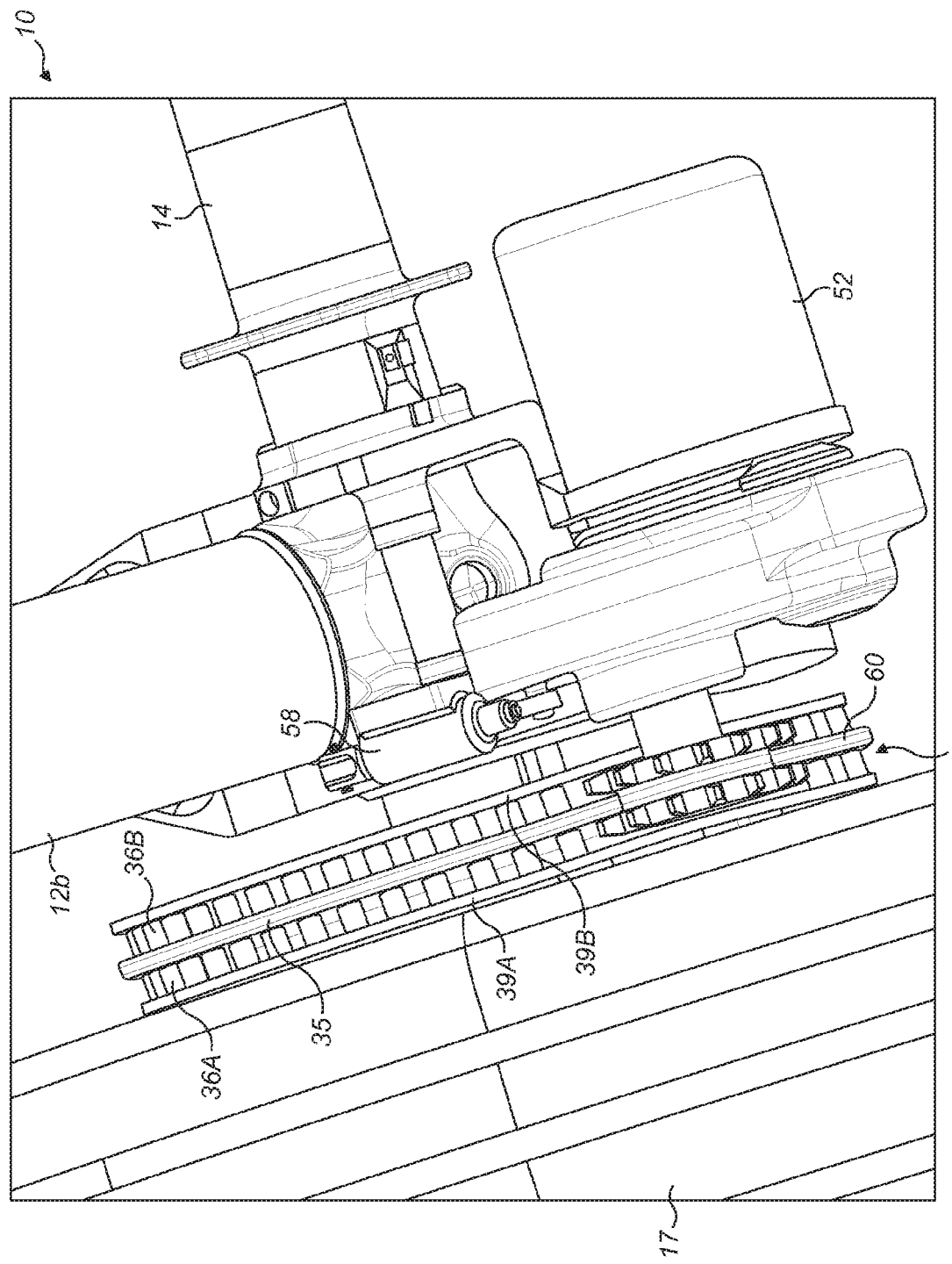
FIG. 2 shows a further isometric view of the drive system of FIG. 1.

The landing gear 10 includes a telescopic shock absorbing main leg 12, including an upper telescopic part 12a (main fitting) and a lower telescopic part 12b (the slider). The upper telescopic part 12a is attached to the aircraft fuselage or wing (not shown) by its upper end (not shown). The lower telescopic part 12b supports an axle 14 carrying a pair of wheels 16, one on either side of the main leg (only one wheel 16 is shown in FIGS. 1 and 2, for clarity). The wheels 16 are arranged to rotate about the axle 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16. The driven gear 20 may be attached to the wheel 16 by a plurality of discrete couplings, which may provide a rigid or flexible attachment. Alternatively, the attachment may be via a flange forming a continuous extension rim projecting axially from either the wheel 16 or the driven gear 20.

The drive system 50 includes a motor 52 which transmits torque to a drive shaft 54 via a gearbox 70. The drive system 50 is supported by a bracket 56 which is rigidly connected to the axle 14 of the landing gear. The bracket 56 includes two lugs comprising half moon clamps to permit ready attachment and detachment of the bracket 56 to the axle 14. The motor 52 is fixedly connected, e.g. by bolting, to the bracket 56. The gearbox 70 is pivotally connected to the bracket 56 at pivot lugs 82 on each arm of the bracket 56 disposed either side of the gearbox 70.

A drive pinion 60 is mounted on the drive shaft 54 so as to be rotatable by the drive shaft about a drive axis. The drive pinion 60, drive shaft 54 and gearbox 70 are pivotable by a linear actuator (positioner) 58, such as a direct drive roller screw electro mechanical linear actuator, extends between the bracket 56 (at an end nearest the axle 15) and the gearbox 70, or more particularly the housing 84 of the gearbox. Thus, linear movement of the actuator 58 is translated into rotational movement of the gearbox 70 and the sprockets 60 about the pivot 82. The drive system 50 can therefore be between a neutral configuration (not shown) in which the drive pinion 60 does not mesh with the driven gear 20, and a driven configuration (shown in FIGS. 1, 2 and 3) in which the drive pinion 60 is in meshed engagement with the driven gear 20. In the neutral configuration the wheel 16 is able to rotate freely, e.g. during take-off and landing, while in the driven configuration the wheel 16 can be driven by the drive system 50, e.g. during ground taxiing.

In the embodiment of FIGS. 1 and 2 the driven gear 20 comprises a roller gear 34 and the drive pinion 60 comprises a sprocket.

The roller gear 34 is formed by a rigid annular ring 35 and a series of pins 28 projecting from both sides of the annular ring 35. A first series of rollers 36a rotatably supported by the pins 38 is provided on one side of the annular ring 35, and a second series of rollers 36b rotatably supported by the pins is provided on the other side of the annular ring. Each series of rollers 36a, 36b extends around the annular ring to form a continuous track. First and second lateral annular rings 39a, 39b sandwich the first and second series of rollers 36a, 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins which are cantilevered off the central spine. The annular ring 35 comprises a plurality of axially extending connection extension tabs (not shown) providing mounting means for mounting the roller gear 34 to the hub 18. Alternatively, the tabs may be substituted for the annular ring 35.

The drive pinion 60 comprises a sprocket having two coaxial rings of radially extending sprocket teeth which can interlock with the rollers 36 of roller gear 34. That is, each ring of sprocket teeth is arranged to mesh with one of the rings of rollers of the driven gear 20.

Figure 3:
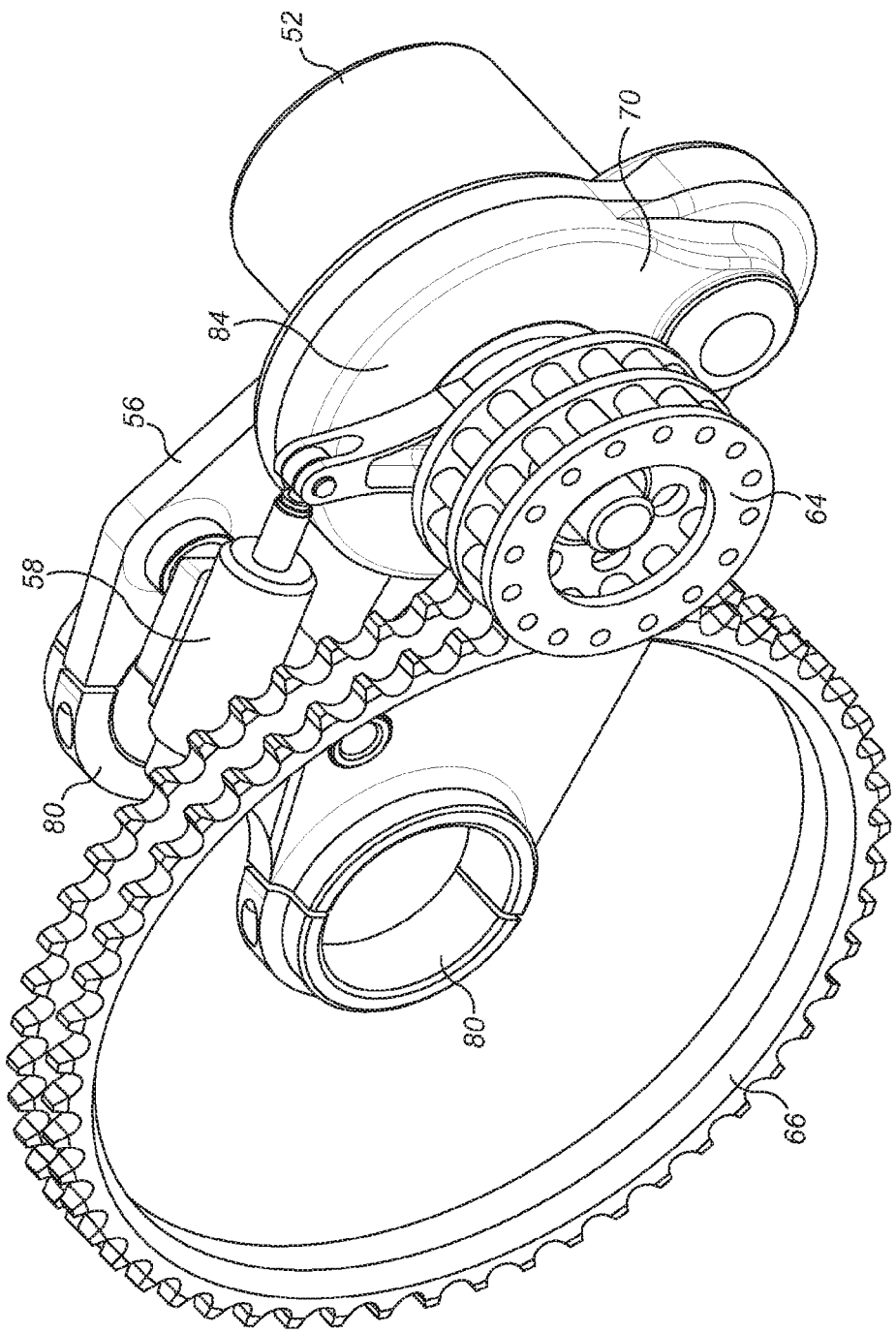
FIG. 3 shows an isometric view of selected components of a drive system according to a second embodiment.

FIG. 3 shows an alternative, and preferred, embodiment in which the driven gear 20 comprises a sprocket instead of a roller gear, and the drive pinion comprises a roller gear instead of a sprocket. Thus, the drive pinion comprises a roller gear 64 having two coaxial rings of rollers and the driven gear 20 is replaced by sprocket 66 having two coaxial rings of sprocket teeth. In all other respects the drive system is identical to that described above with reference to FIGS. 1 and 2, and the features of the drive system described below apply equally to both embodiments. The roller gear 64 may be constructed similarly to the roller gear 34, although of course it has a much smaller diameter and therefore fewer rollers.

An advantage of the sprocket-roller gear arrangement is that it is more tolerant of wheel and axle deformation than meshing toothed gear arrangements. Landing gear wheels and axles are subject to high loads and consequential deformation during ground taxiing, and a driven gear fixed to the wheel will inevitably deform in response to such deformation. Meshing toothed gears are intolerant of such deformation and a typical toothed rim gear may need to be isolated from the wheel via bearings, a flexible interface, or similar. In contrast, the sprocket and roller arrangement of the present invention may be able to tolerate the deformation without such modification.

Such an arrangement also has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

In variations to the embodiments described above, the drive pinion may be formed as a sprocket 60' (see FIG. 4) having a single row of teeth, and the driven gear may be formed as a roller gear having a single row of rollers. The roller gear may take many forms, including the roller gear 34' of FIG. 4 or 69 of FIG. 5. The extension ring 35' (or drum) is rigidly attached to the hub 18 via a plurality of extension tabs 37' so that it extends from an outer circumference of the hub 18 towards the leg 12. Each roller 36' is preferably rotatable about a bush (not shown) which is itself mounted on a pin (not shown).

Figure 5:
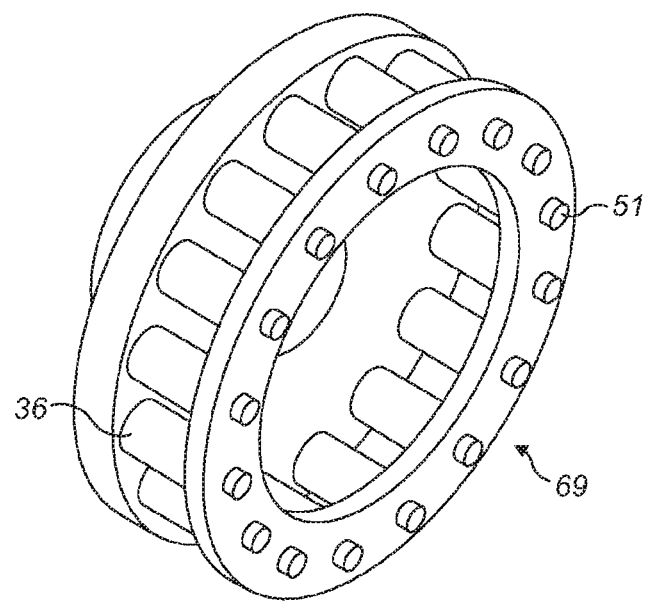
FIG. 5 shows a roller gear suitable for use in a drive system.

In a further variation, illustrated in FIG. 5, the drive pinion may alternatively comprise a single ring of rollers for engaging with a driven gear formed as a sprocket (not shown) having a single row of sprocket teeth. In this example each roller 36 is mounted on a roller mounting pin 51, with a bush (not shown) about which the rollers 36 are rotatable.

Although the Figures only show features of the drive system 50 for driving one of the wheels 16, it is envisaged that these features may be mirrored for the other wheel 16. That is, it is envisaged that one drive system 50 may be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft of the gearbox 70 of each drive system.

Although the Figures only show the drive system 50 supported by a bracket 56 which is rigidly connected to the axle 14 of the landing gear, the drive system 50 may alternatively be mounted on the upper telescopic part 12a (main fitting) or lower telescopic part 12b (slider).

Figure 4:
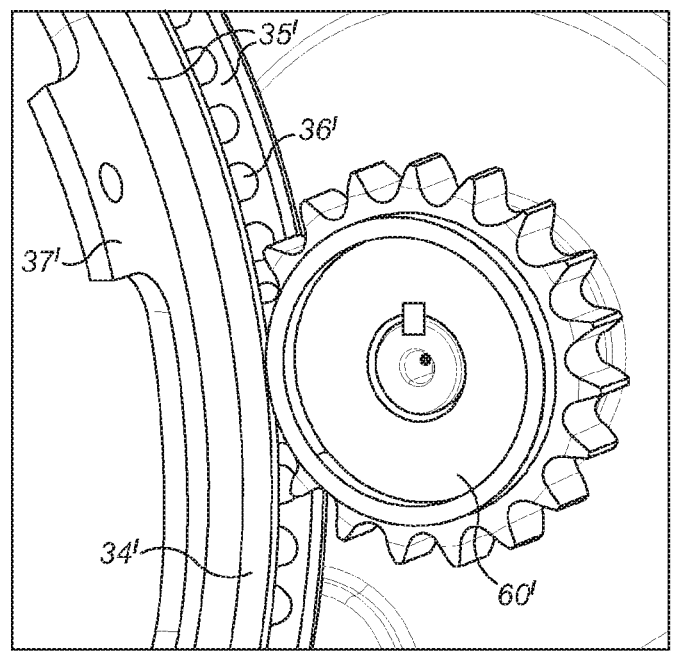
FIG. 4 shows an optional arrangement of a roller gear and sprocket for transferring drive in a drive system.
Figure 6:
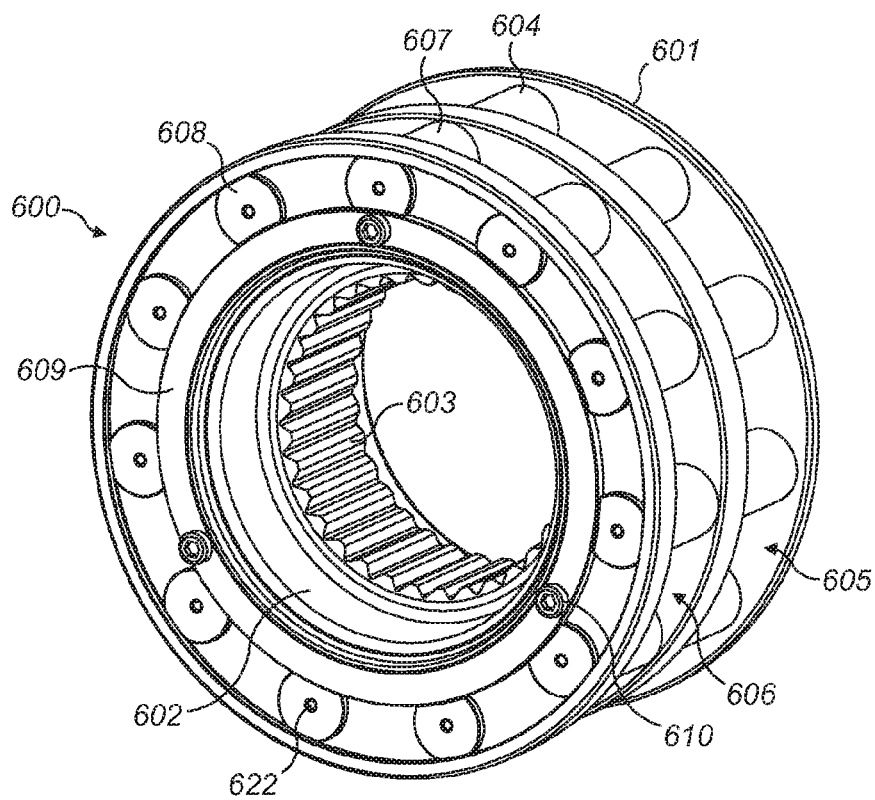
FIG. 6 shows an example of a roller gear according to the present invention.

FIG. 6 illustrates a roller gear 600 according to the present invention. The roller gear 600 comprises a body 601 comprising a core 602. The core 602 has a bore, which is provided with a spline 603, which allows the roller gear 600 to be mounted upon a shaft (not shown) to transmit a torque between the roller gear 600 and the shaft. The roller gear 600 is provided with a series of rollers 604 arranged in a substantially circular array, to form a ring of rollers. In the illustrated embodiment, two circular arrays of rollers are provided side by side and this enables the roller gear 600 to engage to adjacent rows of sprocket teeth, such as is illustrated in FIG. 3. However, a single circular array of rollers 604 may be provided, such that the roller gear 600 is adapted to engage only a single row of sprocket teeth, as is illustrated in FIGS. 4 and 5. The roller gear 600 may therefore comprise one circular array of rollers 605, or two circular arrays of rollers 605 and 606. If required, further circular arrays of rollers may be provided adjacent to first and second arrays to provide the ability to engage further rows of sprocket teeth. The rollers are arranged so as to have axes of rotation which are parallel to the axis of rotation of the roller gear.

Adjacent rollers 604, 607, may be mounted on a common roller pin 608. As is described above in relation to other examples of roller gears, the rollers 604, 607, may be mounted to the roller pins 608 and may be rotatable relative thereto. A bush 615 may be provided between the roller and the roller pin 608 to facilitate relative rotation therebetween. A roller pin head locking ring 609 can be provided, which will be described in greater detail in relation to FIG. 7. The locking ring 609 may be removably attached to the roller gear 600 via removable attachment means 610, which may be screws or bolts or any other suitable removable attachments.

The roller gear 600 in the illustrated embodiment comprises eleven pairs of rollers arranged in two circular arrays around the core of the roller gear 600. The roller arrays are axially coincident, so that adjacent rollers' rotational axes are coincident and adjacent rollers can therefore be mounted on a common roller pin 608.

Figure 7:
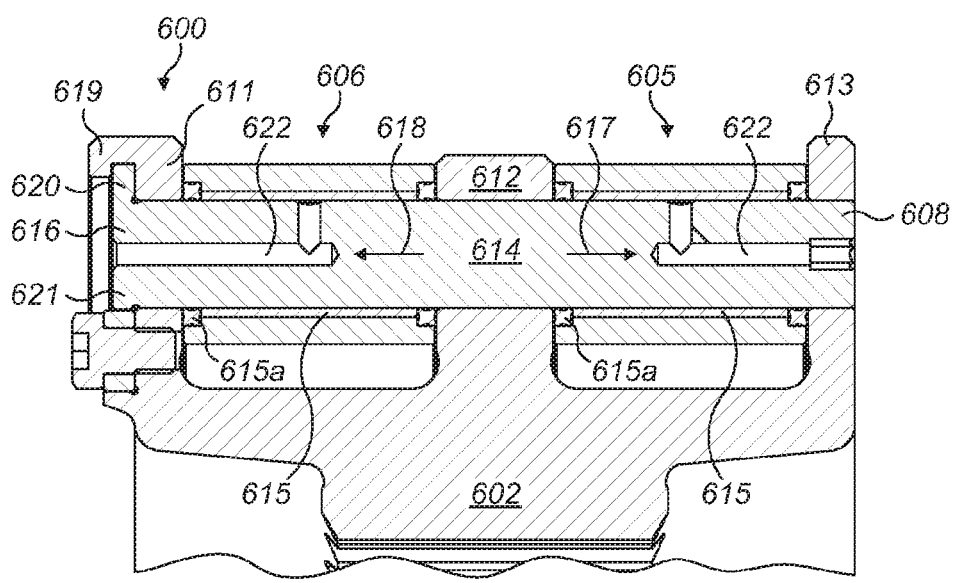
FIG. 7 shows a section through the roller gear of FIG. 6.

Mounting and attachment of the roller pins to the roller gear 600 will now be described in relation to FIG. 7, which shows a section through a roller gear 600 at a roller mounting pin 608. The roller gear 600 is provided with at least two roller mounting members 611 and 612, and may be provided with a third roller mounting member 613, where a second array 605 of rollers is required. The roller mounting members may be substantially annular rings. A function of the roller mounting members is to retain roller mounting rings 608 in an array of suitable openings to hold the array of rollers 604, 607. Each roller mounting member is therefore provided with an array of openings for receiving the roller mounting pins 608. The roller mounting members may be mounted to the body 601 of the roller gear, although other means may be provided to support the mounting members. At least one, or more, of the mounting members may, for example, be retained relative to one another by pins 608 on which the rollers are mounted.

Roller mounting pin 608 has a roller mounting shaft 614, which has an outer diameter configured to enter the roller 604, such that the rollers can be rotatably mounted on the roller mounting pins 608. A bush 615 may further be provided to facilitate rotation of the rollers on the roller mounting pin. The roller mounting pin 608 is provided with a head 616 at a head end of the pin 608.

The head 616 of the roller mounting pin is provided with at least a portion having a maximum radial dimension from the centre of the pin mounting shaft which is greater than the radius of the pin mounting shaft, so that the pin is prevented from passing entirely through the illustrated opening in the first roller mounting member 611. This feature can limit axial displacement of the roller mounting pin 608 in a first direction indicated by arrow 617. Being placed at one end of the pin, the head 616, when retained against the first roller mounting member 611, can locate the pin in the roller mounting member(s) to retain the rollers on the roller gear.

It is also necessary to prevent unwanted displacement of the roller mounting pin 608 in a second direction 618, opposite the first direction 617, particularly when the roller gear 600 is fully assembled and especially when it is in use. To provide this function, the first roller mounting ring 611 is provided with primary roller mounting pin retaining means, in the form of the illustrated pin head retaining means 619. This retaining means 619 is spaced from and can be formed as a part of, or attached to, the first roller mounting member 611 adjacent the head 616. The retaining means 619 further extends around the roller mounting pin head, so that while the roller mounting ring 611 prevents movement of the roller mounting pin head 616 in a first direction 617, the pin head retaining means prevents movement of the roller mounting pin head 616 in a second direction 618, opposite the first direction 617. In this manner, once assembled, the roller mounting pin 608 is retained in the openings of the roller mounting rings of the roller gear 600.

For the purposes of maintenance and assembly of the roller gear 600, it is desirable for the roller mounting pins 608 to be repeatably removable and replaceable in the roller mounting rings 611, 612, 613. To this end, it is possible to arrange the roller mounting pin head 616 and the pin head retaining means 619, so that they may be selectively engaged and disengaged to prevent or allow displacement of the roller mounting pin 608 in the second direction 618.

This selective engagement can, in one example, be achieved by providing a removable pin head retaining means 619, which may be provided in the form of a removable or displaceable element, for retaining the pin head 616 relative to the mounting member 611. A removable pin head retaining element may therefore be provided in the form of a removable retaining means 619, which may be removably attached to, and preferably spaced from, the roller pin mounting member 611, to retain the pin head and limit or prevent axial displacement thereof.

Figure 8:
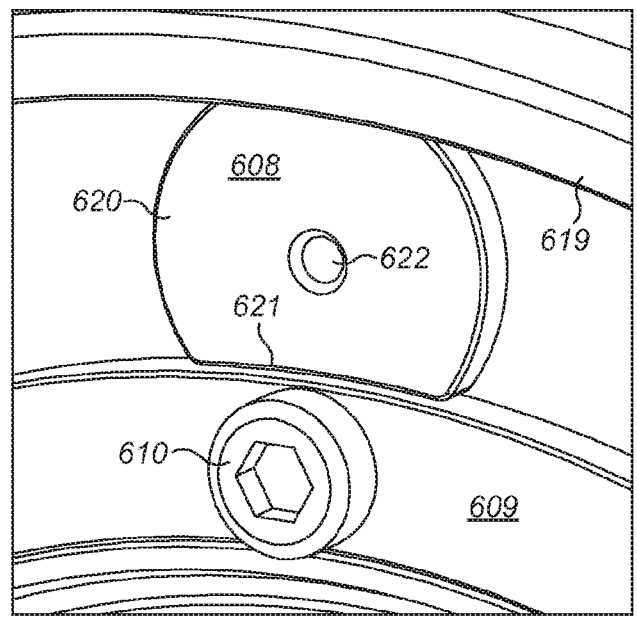
FIG. 8 shows further detail of the roller gear of FIG. 6.
Figure 9:
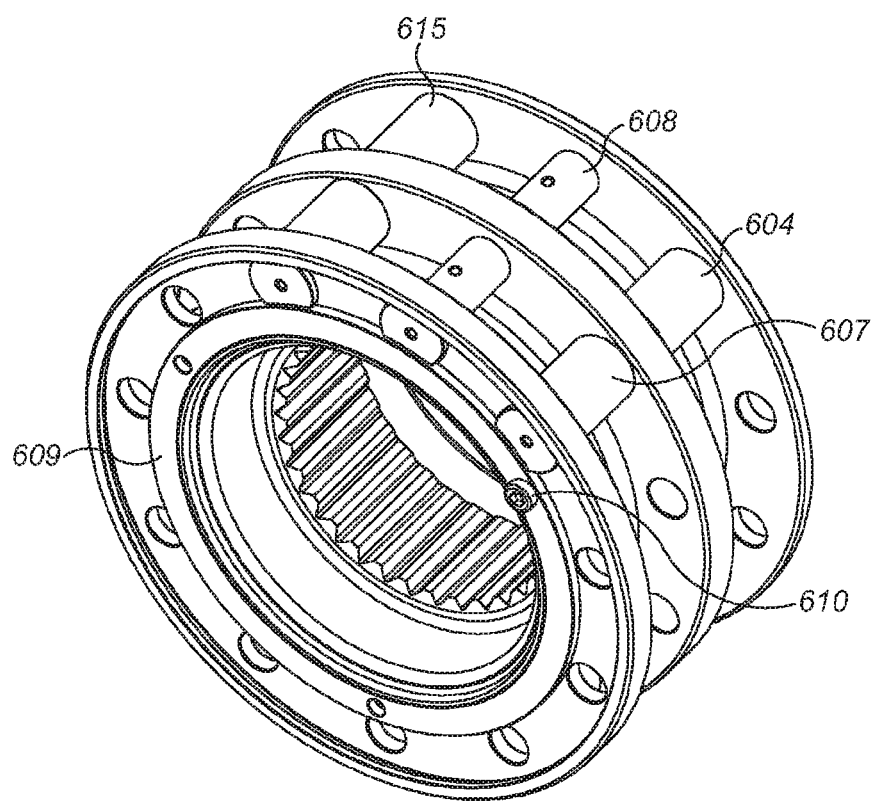
FIG. 9 shows a partially assembled view of the roller gear of FIG. 6.

In the illustrated embodiment, the roller mounting pin head 616 is asymmetrical and has, at a first side, a first radially extending portion 620 for engaging the pin head retaining means 619. At a different circumferential location on the pin head 616, there is provided a portion of reduced radius 621. In this way, when the pin 608 is rotated about its axis, it can be seen that the area of reduced radial dimension 621 of the pin head 616 can be located towards or away from the pin head retaining means 619. At the appropriate point of rotation of the pin 608 about its longitudinal axis, the area of reduced radius 621 is not located between the pin head retaining means 619 and the pin mounting ring 611, and so the pin 608 is free to be displaced in the second axial direction 618. This released orientation is realised when the pin is rotated substantially 180 degrees about its longitudinal axis relative to position shown in FIG. 7. In this way, when the pin 608 is suitably rotated, it can be extracted from the rollers 604 and 607 and from the roller mounting rings 611, 612, 613, by displacement in the second axial direction 618, towards the pin head 616. Further detail of the arrangement is shown in FIGS. 8 and 9 for clarity, using the same reference numerals as above to illustrate the relative arrangements of the components.

To prevent unwanted rotation and removal of the pin 608 from the roller gear 600, a secondary roller mounting pin retaining means can be provided in the form of pin head locking means 609. When the pin 608 is rotated to its retained configuration as illustrated in FIG. 7, with the portion of increased radial dimension 620 located between the pin head retaining means 619 and the pin mounting member 611, the pin head locking means 609 can be located adjacent the portion of reduced radial dimension 621 of the pin head 616. The pin head locking means 609 can therefore limit or prevent rotation of the pin head 616, so that it is locked in the retained position and the pin is restrained from axial movement relative to the roller pin mounting members 611, 612 and 613. A pin head locking means 609 may be provided, as illustrated, as an annular ring, which when in place, locks all heads 616 of the whole array of roller mounting pins 608. However, alternatively, separate pin head locking means may be provided for individual pins 608, or for subsets of the array of pins 608. In this manner, the roller gear 600 is provided with an array of roller mounting pins 608, and at least one of the roller mounting pins can be provided with a pin head arranged for selective engagement and disengagement with pin head retaining means 619. The roller mounting member 611 can be further provided with selectively engageable pin head locking means for locking the pin head in an engaged position, where it engages pin head retaining means 619. The pin 608 can therefore have an engaged position in which its axial displacement is prevented or limited, and a disengaged position, in which it is free to be displaced axially relative to the roller mounting ring or rings. The roller gear can therefore also have an engaged configuration in which the pins 608 are prevented from removal from the gear and a disengaged configuration in which the pins are free for removal from the roller gear.

To facilitate rotation of the pin or pins 608, a drive input feature 622 may be provided at least one end of the pin 608 and may be provided at both ends of the pin 608, to facilitate the input of a torque to the pin, to rotate the pin between its engaged and disengaged positions. The drive feature may therefore be located at the head end of the pin, or at the end of the pin distal from the head, or at both ends. The drive feature may be an internal hex-drive, or could be a threaded hole, a cavity for receiving a screwdriver head or hex key, a hex bolt. The drive feature may be any internal or protruding feature which allows the transmission of a torque to the pin 608 to rotate it about its longitudinal axis.

Figure 10:
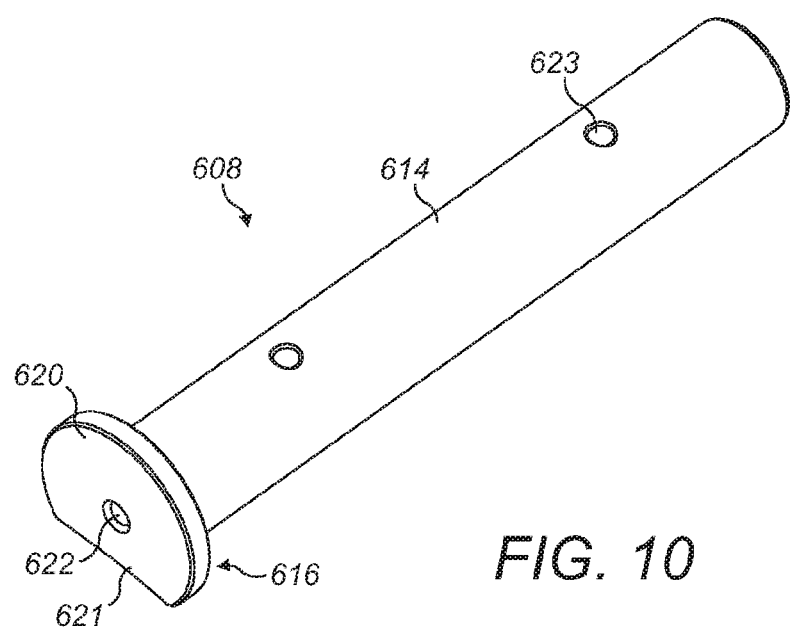
FIG. 10 shows a roller mounting pin for the roller gear of FIG. 6.

FIG. 10 shows a roller mounting pin of the embodiment of FIGS. 6 to 9. The pin has a shaft 614 which has a substantially smooth outer surface and has no connection features such as threads or drive inputs. The shaft is therefore of substantially constant diameter and has a smooth surface for receiving the rollers, and preferably the bushes 615, where used, and for mounting in the openings in the roller pin mounting members 611, 612, 613. The roller mounting pin also has a head 616 as described in the above, being rotationally asymmetrical and has, at a first side, a first radially extending portion 620 for engaging the pin head retaining means 619. At a different circumferential location on the pin head 616, there is provided a portion of reduced radius 621. The head has a perimeter having a first, substantially arc-shaped, portion, and a second, substantially straight, portion at the side having a reduced radial dimension.

The roller gear illustrated in FIGS. 6 to 9 is generally suited to the arrangement illustrated in FIG. 3. However, it will be appreciated that the arrangement of mounting rings, rollers and roller mounting pins described in relation to FIGS. 6 and 7 could equally be applied to a larger diameter roller gear, such as that illustrated in FIG. 4 for engagement by a drive sprocket 60 as shown in that Figure.

Figure 11:
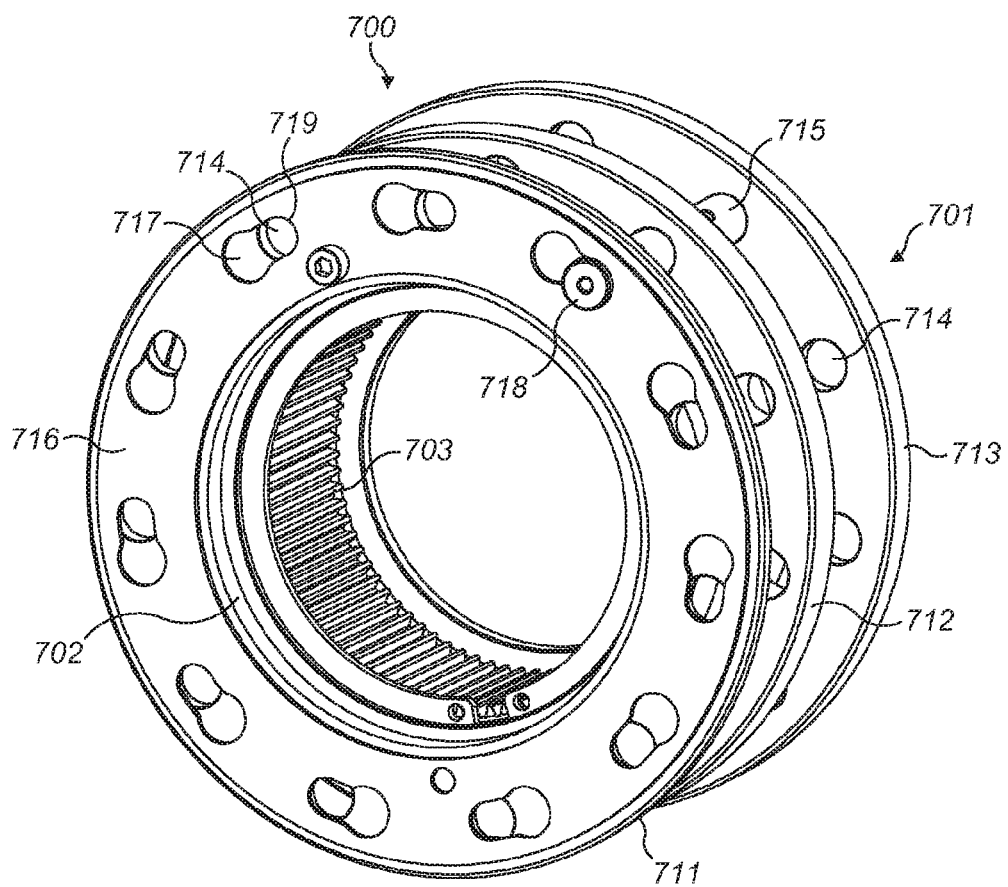
FIG. 11 shows an alternative roller gear.

FIG. 11 shows an alternative arrangement of a pin mounting and retaining means for a roller gear. The body of the roller gear 700 is similar to that described in relation to FIGS. 6 to 9. The body 701 comprises a core 702, which is provided with a spline 703. The body also comprises at least two, and in the illustrated example, three, roller pin mounting members 711, 712 and 713. The roller mounting members are provided with an array of openings 714, each for receiving a pin 715 for mounting a roller to the body in the same way as is illustrated in relation to FIGS. 6 to 9.

The principal difference between the embodiment of FIGS. 6 to 10 and FIGS. 11 to 13 is in the way which the roller pins 715 are retained in the roller mounting members. In the embodiment of FIGS. 6 to 9, the primary roller pin head retaining means is provided in the form of the feature 619 on the roller mounting member 611. In the embodiment of FIG. 11, the primary pin head retaining means is provided in the form of a plate 716, which is provided with at least one opening 717 corresponding to an opening 714 in the roller mounting member 711. The opening 717 is arranged such that relative translational or rotational movement between the opening in the primary roller pin retaining means and the pin can locate the roller pin head 718 at a roller pin release portion 719a of the opening 717. By movement of the roller pin retaining means relative to the roller pin in a different direction, the roller pin head 718 can be located in a roller pin retaining portion 719 of the opening 717. In the illustrated embodiment, a relative rotational motion between the pin and the primary roller pin retaining means locates the roller pin head either at the pin head release portion 719a of the opening 717, or at the pin head retaining portion 719 of the opening 717. In the illustrated example, the primary roller pin retaining means is an annular ring 716, comprising an array of openings 717, each opening 717 corresponding to an opening in the roller mounting members 711, 712, 713. A rotational movement of the illustrated primary roller pin retaining means 716 can simultaneously engage or disengage all of the roller mounting pins 715 located in all openings 714 of the roller mounting members 711, 712, 713.

Figure 12:
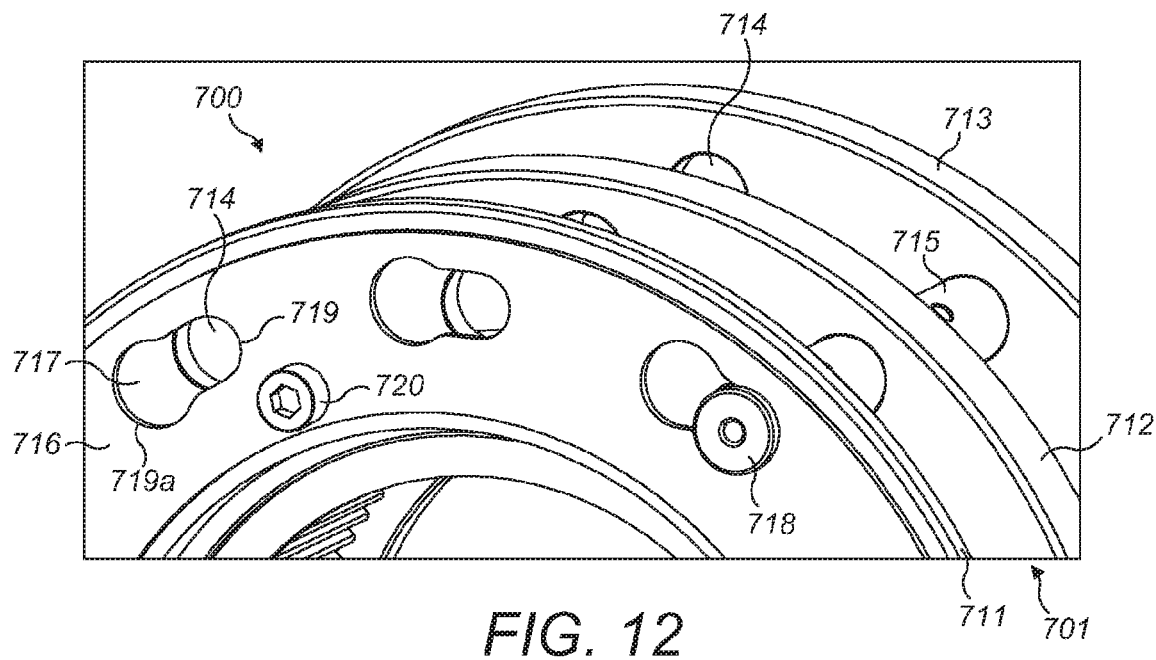
FIG. 12 shows further detail of the roller gear of FIG. 11.

Greater detail of the arrangement can be seen in FIG. 12. A secondary roller mounting pin retaining means 720, for locking the primary roller mounting pin retaining means 716 and the roller mounting pin head 718 in an engaged state is provided, specifically in the form of a hex bolt 720. However, any suitable fixing means can be provided to generally prevent movement of the primary pin head retaining means 716 relative to the pin head 718 or the roller mounting member 711.

Figure 13:
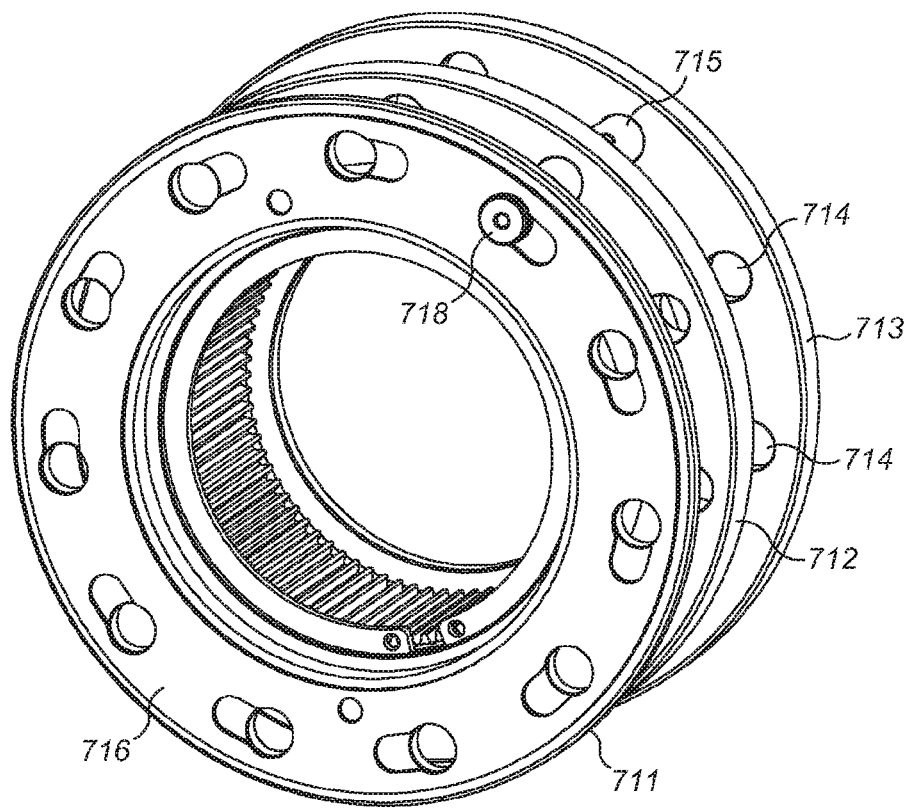
FIG. 13 shows the roller gear of FIG. 11 configured for the removal or installation of roller mounting pins.

FIG. 13 shows an arrangement where the secondary pin head retaining means 720 has been removed, thus releasing the annular ring shaped primary pin head retaining means 716 to translate or rotate relative to the pin 715. This allows the pin head 718 to be located in the pin head release portion 717. It will therefore be apparent that in the configuration shown in FIG. 13, the pin 715 is free to translate axially along its longitudinal axis and so can be extracted from or displaced within the openings in the roller mounting members 711, 712, 713.

Figure 14:
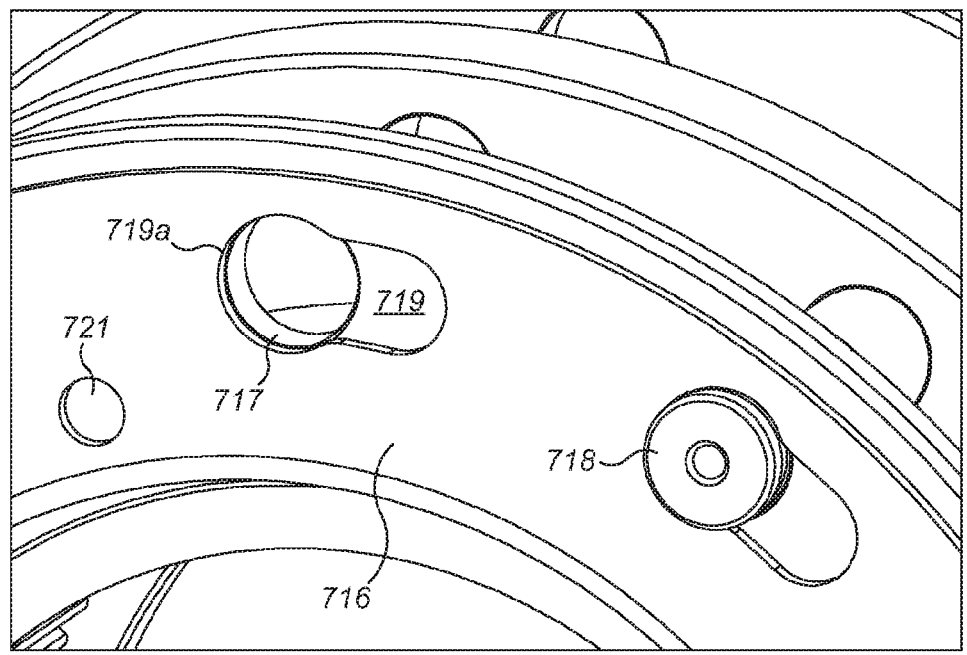
FIG. 14 shows detail of the roller gear of FIG. 13.

FIG. 14 shows the arrangement of FIG. 13 in greater detail. Here it can be seen that the primary pin head retaining means 716 has a pin head release portion 717 in which opposing faces of the opening are spaced apart by a distance greater than the diameter of the pin head 718, so that the pin head can pass through the opening to extract the pin from the roller gear. The release portion 717 preferably also has opposing faces which are spaced apart by a distance greater than the diameter of the shaft of the roller mounting pin, so that the whole shaft may pass through the opening to extract the pin from the roller gear.

In contrast to the pin head release portion, the pin head retaining portion 719 has opposing faces which are spaced apart by a distance less than the diameter of the pin head and preferably also less than the diameter of the shaft of the roller mounting pin, to prevent either or both of those parts of the pin passing through the retaining portion 719. The faces of the retaining portion 719 are, however, preferably spaced apart by a distance greater than the diameter of the neck of the roller mounting pin 715, which separates the roller mounting shaft of the pin from the head 718 of the pin, which allows the neck to be received in the retaining portion 719.

A further engagement feature 721 for engaging the secondary roller mounting pin retaining means 720 can be seen, in this instance provided in the form of an opening, which may be circular, but any feature suitable for engaging a secondary roller mounting pin head retaining means may be provided, such as a diameter change, a dip or recess or profiled section, for enabling the secondary pin head retaining means to prevent rotational translation of the primary pin head retaining means relative to the opening or openings of the roller mounting members 711, 712, 713.

Figure 15:
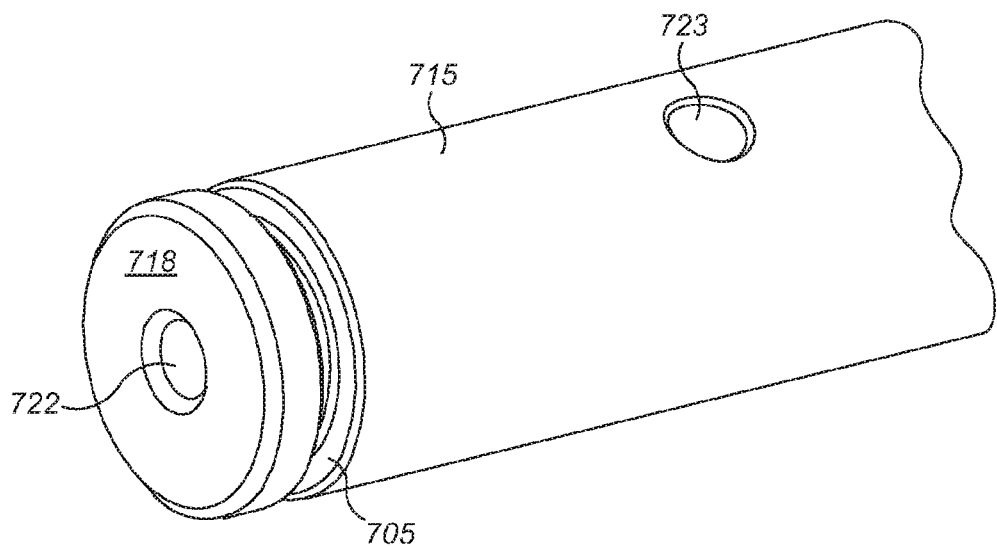
FIG. 15 shows detail of a roller mounting pin for the roller gear of FIG. 11.

A roller mounting pin 715 for use in the embodiment of FIGS. 11 to 14 is illustrated in greater detail in FIG. 15. The pin 715 comprises a shaft portion, which is of substantially constant diameter, and further has a smooth outer surface for receiving rollers to be mounted on the shaft, optionally with bushes mounted between the shaft and the roller in the same way as is illustrated by the bush 165 of FIGS. 6 to 9. Pins 715 comprise a pin head 718, which is separated from the main pin shaft by a neck portion 705, which has a reduced radial dimension in order to engage with the pin retaining portion 719 of the pin head retaining means 716 illustrated in FIG. 14. The pin head also comprises an opening 722 at its head end. This opening can be an opening to a bore which passes along some or all of the length of the shaft and can connect with further opening 723, which can provide a fluid communication path between the outer surface of the shaft and the central opening 722. This can allow a lubricant to be provided in the opening 722 to provide lubrication to rollers mounted to the shaft if necessary. However, if suitable bushes are used, for example bushes constructed of PTFE or other low friction or self lubricating materials, then this lubrication path may not be necessary.

The opening 722 may further comprise an engagement feature for transmitting a torque to the pin. The same openings may be applied to the pin of FIG. 10 and the ability to provide a torque input to the pin by the opening 622 of FIG. 10 can be particularly beneficial. In this way, the opening can optionally have a dual function as a torque input feature and also a lubricant input feature if so desired. The opening 622 or 722 may also be configured to receive a tool for extracting the pin 622 or 722 from the roller gear when released.

In each of the arrangements described above the principle of achieving drive via meshing between a sprocket and roller gear/roller chain can be applied when the driven gear comprises the sprocket and the drive pinion comprises the roller gear/roller chain, and vice versa.

Although the invention has been described above with reference to one or more preferred embodiments, it will be appreciated that various changes or modifications may be made without departing from the scope of the invention as defined in the appended claims.

The invention claimed is:

1. A roller gear comprising:
   a series of rollers arranged to form a substantially circular array;
   at least two roller mounting members axially spaced from one another along an axis of rotation of the roller gear, each roller mounting member comprising a substantially circular array of openings for receiving roller mounting pins therein to mount the rollers between the roller mounting members;
   an array of roller mounting pins disposed in the openings, each of the roller mounting pins comprising a roller mounting shaft, having a longitudinal axis, for entering the roller mounting members and the roller to retain the roller relative to the roller mounting members;
   at least one of the roller mounting pins comprising a roller mounting pin head, delimited from the shaft by a change in radial dimension of the pin;
   the roller gear further comprising primary roller mounting pin retaining means, arranged to engage the head of the at least one roller mounting pin to prevent axial movement of the roller mounting pin in a direction of its longitudinal axis;
   wherein one of the primary roller pin retaining means and a secondary roller pin retaining means is a substantially annular member that is moveable relative to the circular array of openings from a first configuration to a second configuration to release or unlock the array of roller mounting pins simultaneously.

2. A roller gear according to claim 1, wherein the primary roller mounting pin retaining means is arranged to engage or disengage the roller mounting pin by relative rotational movement between the roller mounting pin and the roller mounting pin retaining means.

3. A roller gear according to claim 1, wherein the one of the primary and secondary roller pin retaining means is arranged to retain or lock the array of roller mounting pins simultaneously.

4. A roller gear according to claim 1, further comprising fixing means to fix at least one of the primary and secondary roller pin retaining means relative to a roller mounting member to which it is mounted.

5. A roller gear according to claim 1, wherein the head of the roller mounting pin has a perimeter having a first, substantially arc-shaped, portion, and a second, substantially straight, portion.

6. A roller gear according to claim 1, wherein the primary roller mounting pin retaining means comprises an annular portion arranged around a circumference of the roller mounting member.

7. A roller gear according to claim 6, wherein the primary roller mounting pin retaining means comprises a first, axially extending, annular portion, and a second, radially extending, annular portion.

8. A roller gear according to claim 1, further comprising the secondary roller mounting pin retaining means for restricting rotation of at least one of the roller pins, wherein the secondary roller mounting pin retaining means is arranged to be detachably mounted adjacent the at least one roller pin head.

9. A roller gear according to claim 8, wherein the secondary roller mounting pin retaining means is arranged at a distance, from a centre of the opening in which the at least one roller pin is located, which is less than the maximum radial dimension of the roller pin head.

10. A roller gear according to claim 1, wherein the secondary roller mounting pin retaining means is arranged to retain more than one roller mounting pin of the roller gear.

11. A roller gear according to claim 1, wherein the secondary roller mounting pin retaining means is a substantially annular ring, arranged such that at least one of its inner or outer edges is located at a distance, from a centre of the openings in which the roller pins are located, which is less than a maximum radial dimension of the roller pin heads.

12. A body for a roller gear according to claim 1, comprising:
first and second roller mounting members, each roller mounting member comprising a plurality of openings arranged in a substantially circular array, for receiving roller mounting pins to mount rollers thereto;
at least one of the roller mounting members comprising roller mounting pin retaining means, arranged to engage a head of at least one of the roller mounting pins to retain the head between the roller mounting member and the roller pin head retaining means.

13. A roller mounting pin for a roller gear according to claim 1, comprising:
a pin mounting shaft, having a first diameter, for entering the roller mounting members and the roller, to rotatably mount the roller relative to the roller mounting members;
a head, having a first portion having a first radial dimension greater than the diameter of the pin mounting shaft, to prevent movement of the head relative to the roller mounting members in a first axial direction; and,
wherein the head of the pin has a second portion having a second radial dimension, smaller than the first radial dimension.

14. An aircraft undercarriage drive system comprising a roller gear according to claim 1.

15. An aircraft undercarriage drive system according to claim 14, wherein the drive system is supported by a bracket which is rigidly connected to the axle, main fitting or slider part of the landing gear.

16. An aircraft undercarriage drive system according to claim 15, wherein the bracket includes two lugs comprising half-moon clamps to permit ready attachment and detachment of the bracket.

17. A roller gear comprising:
a series of rollers arranged to form a substantially circular array;
at least two roller mounting members axially spaced from one another along an axis of rotation of the roller gear, each roller mounting member comprising a substantially circular array of openings for receiving roller mounting pins therein to mount the rollers between the roller mounting members;
an array of roller mounting pins disposed in the openings, each of the roller mounting pins comprising a roller mounting shaft, having a longitudinal axis, for entering the roller mounting members and the roller to retain the roller relative to the roller mounting members;
at least one of the roller mounting pins comprising a roller mounting pin head, delimited from the shaft by a change in radial dimension of the pin;
primary roller mounting pin retaining means, arranged to engage the head of the at least one roller mounting pin to prevent axial movement of the roller mounting pin in a direction of its longitudinal axis; and
secondary roller mounting pin retaining means being a substantially annular ring, arranged such that at least one of its inner or outer edges is located at a distance, from a centre of the openings in which the roller pins are located, which is less than a maximum radial dimension of the roller pin heads;
wherein the secondary roller mounting pin retaining means is repeatably attachable and detachable from the roller mounting member to lock and release the roller mounting pins.

18. A roller gear comprising:
a series of rollers arranged to form a substantially circular array;
at least two roller mounting members axially spaced from one another along an axis of rotation of the roller gear, each roller mounting member comprising a substantially circular array of openings for receiving roller mounting pins therein to mount the rollers between the roller mounting members;
an array of roller mounting pins disposed in the openings, each of the roller mounting pins comprising a roller mounting shaft, having a longitudinal axis, for entering the roller mounting members and the roller to retain the roller relative to the roller mounting members;
at least one of the roller mounting pins comprising a roller mounting pin head, delimited from the shaft by a change in radial dimension of the pin;
the roller gear further comprising primary roller mounting pin retaining means, arranged to engage the head of the at least one roller mounting pin to prevent axial movement of the roller mounting pin in a direction of its longitudinal axis;
wherein at least one roller mounting pin has a neck of reduced diameter relative to the pin head and the pin shaft, for engaging the primary pin head retaining means to retain the pin in the roller gear.

19. A roller gear according to claim 18, wherein the primary roller mounting pin retaining means has a pin head retaining portion having a pair of opposed sides spaced apart by a distance greater than the diameter of the neck of the roller mounting pin and less than the diameter of the head and the diameter of the shaft of the roller mounting pin.

20. A roller gear according to claim 18, wherein the primary roller mounting pin retaining means further comprises a pin head release portion having opposing faces spaced apart by a distance greater than the diameter of the pin head or the shaft of the roller mounting pin.

21. A roller gear according to claim 20, wherein the primary pin head retaining means has an opening comprising a pin head retaining portion having a pair of opposed sides spaced apart by a distance greater than the diameter of the neck of the roller mounting pin and less than the diameter of the head and the diameter of the shaft of the roller mounting pin.

22. A roller gear according to claim 21, wherein the primary roller mounting pin retaining means is slidable relative to the roller mounting member to selectively locate the roller mounting pin head in the pin head retaining portion or the pin head release portion.

23. A roller gear according to claim 20, wherein the primary roller mounting pin retaining means is a substantially annular ring comprising an array of openings comprising a pin head retaining portion having a pair of opposed sides spaced apart by a distance greater than the diameter of the neck of the roller mounting pin and less than the diameter of the head and the diameter of the shaft of the roller mounting pin.

24. A roller gear according to claim 23, wherein the primary roller mounting pin retaining means is arranged to be rotatable from a first position, in which the array of openings in the roller mounting members is aligned with the array of pin head retaining portions, and a second position, in which the array of openings in the roller mounting members is aligned with the array of pin head release portions.

25. A roller gear according to claim 1, wherein the at least one of the primary and secondary roller pin retaining means is arranged to release or unlock the array of roller mounting pins simultaneously by removing one of the primary and secondary roller pin retaining means.

* * * * *